United States Patent [19]

Hinds

[11] 4,207,185
[45] Jun. 10, 1980

[54] METHOD FOR PURIFYING LIQUIDS

[75] Inventor: Robert J. Hinds, San Rafael, Calif.

[73] Assignee: Chevron Research Company, San Francisco, Calif.

[21] Appl. No.: 954,683

[22] Filed: Oct. 25, 1978

Related U.S. Application Data

[63] Continuation of Ser. No. 788,378, Apr. 18, 1977, abandoned.

[51] Int. Cl.² .............................................. B03D 1/24
[52] U.S. Cl. .................................. 210/44; 210/195.3; 209/164
[58] Field of Search ................ 210/44, 221 P, 221 M, 210/221 R, 195.1, 200, 199, 195.3; 209/164, 166, 168, 169, 170

[56] References Cited

U.S. PATENT DOCUMENTS

| | | | |
|---|---|---|---|
| 3,048,272 | 8/1962 | Miller | 209/166 |
| 3,799,350 | 3/1974 | Savall et al. | 210/221 P |
| 3,909,287 | 9/1975 | Rundell et al. | 210/44 |

FOREIGN PATENT DOCUMENTS

| | | | |
|---|---|---|---|
| 336277 | 5/1972 | U.S.S.R. | 210/221 P |
| 429030 | 10/1974 | U.S.S.R. | 210/221 P |

Primary Examiner—Benoit Castel
Attorney, Agent, or Firm—D. A. Newell; R. H. Davies; M. K. Bosworth

[57] ABSTRACT

A method for separating a first liquid from a mixture with a second liquid or particulate solid by a series of froth flotation and froth separation stages is improved by recycling a portion of the mixture recovered upstream of the last flotation stage to an initial or an intermediate stage further upstream from the point where the recycled liquid is obtained.

6 Claims, 1 Drawing Figure

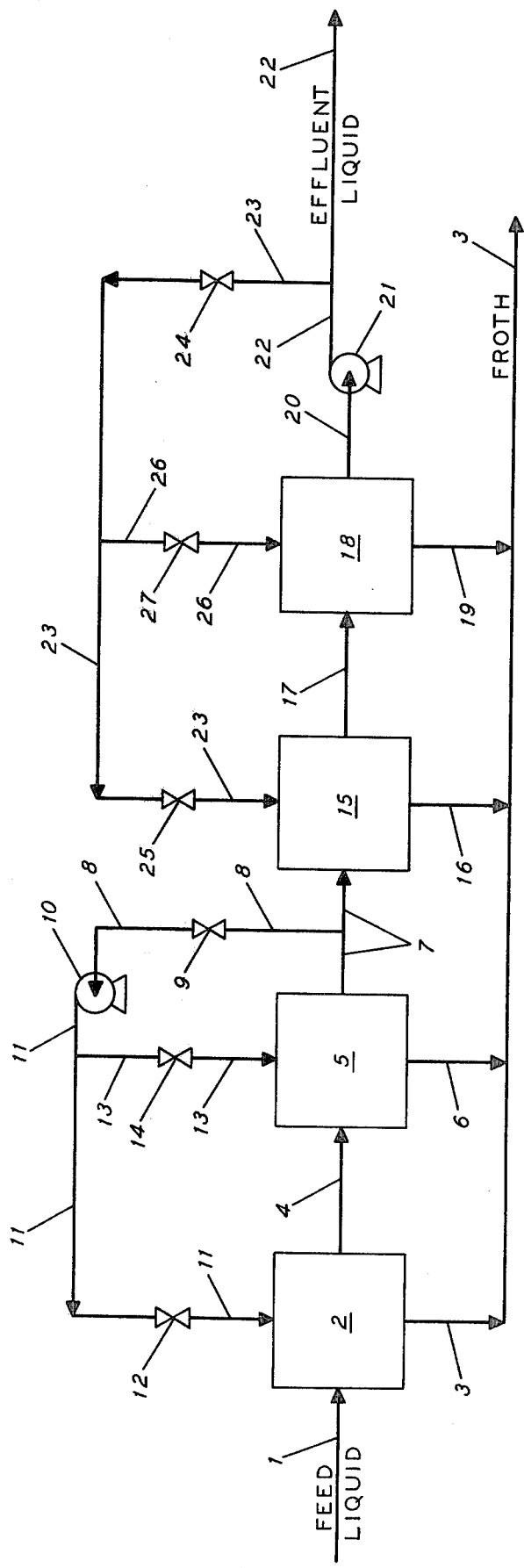

METHOD FOR PURIFYING LIQUIDS

CROSS-REFERENCE TO RELATED APPLICATION

This application is a continuation of U.S. Ser. No. 788,378 filed Apr. 18, 1977, now abandoned.

BACKGROUND OF THE INVENTION

The present invention relates to an improved method for carrying out froth flotation separation.

A variety of methods for purifying liquids by flotation techniques are well known. Particular applications of flotation include removing finely divided solids or organic liquid impurities from water. Flotation methods are also widely used for separating a desired mineral from solid waste materials in suspension in liquids such as water.

Flotation purification techniques typically involve forming a froth by mixing air or another gas with water to be purified or with another liquid, usually after addition of a frothing agent or other reagent to aid in froth formation or wetting. The froth formed floats on the surface of the liquid and is easily separated by mechanical means from the liquid. Impurities contained in the water or other liquid adhere selectively to bubbles of air or other gas rising through the liquid. The impurities are floated into the froth layer above the liquid and are separated from the liquid with the froth. Flotation purification of water is used commercially for removing liquid oils from water, as well as for removing various solids.

Flotation separation of liquid or particulate solid material from a liquid to be purified is often undertaken in a series of three or more stages or steps. Each step involves, first, mixing a gas with the liquid to form a froth which contains a material to be separated from the liquid, and, second, separating the froth from the liquid. After each stage is finished (except the last), the liquid is passed on to a downstream stage, where the froth formation and separation operation is repeated. The number of stages used in any given commercial embodiment of a froth flotation system depends on the difficulty of separating the particular material involved; often 4-6 stages are used.

One commercially available flotation system includes four serial stages. Liquid recovered from the last stage is recycled to the first stage, and to the intermediate second and third stages, and also to the last stage. The recycled, previously treated liquid recovered from the last stage effluent is used to mix air with the liquid in each stage by jetting recycled liquid into which gas has been induced into a body of the liquid to be treated. In each stage, the resulting froth or foam is skimmed off the body of liquid. After separation of froth, the liquid is passed to the next stage. The body of liquid being treated in a given stage is maintained substantially separate from the body of liquid in upstream or downstream stages adjacent the given stage by a baffle, which prevents froth from the given stage from migrating to upstream or downstream stages.

U.S. Pat. No. 3,647,069 discloses apparatus and a method for performing flotation separation, particularly in the setting of separating solids, such as silica, and petroleum liquid materials from water, and also for deaerating water. U.S. Pat. No. 3,864,251 discloses the use of froth flotation for recovering bitumen from tar sand and water. U.S. Pat. No. 3,884,803 discloses the use of froth flotation to purify water which has been contaminated with a high API gravity oil. The Encyclopedia of Chemical Technology, Second Edition, Vol. 9, pages 380-398, includes a discussion of the use of froth flotation for separating minerals, such as metal ores, from waste materials and water.

SUMMARY OF THE INVENTION

In an embodiment, the present invention relates to an improvement in a method for separating a first liquid from a mixture of the first liquid and a particulate solid or a second liquid insoluble in the first liquid by treating the mixture in a series of flotation steps, including at least a first step and a last step, each of the steps including forming froth including the solid or the second liquid by mixing gas with the mixture and separating froth from the mixture, the improvement in the method comprising admixing the mixture, before separating froth from the mixture in the first step, with a recycle portion of the mixture remaining after froth is separated from the mixture in the first step and before gas is mixed with the mixture in the last step.

Preferably, the series of flotation steps includes at least one intermediate step, the recycle portion is separated from the mixture after froth is separated from the mixture in the intermediate step, and the recycle portion is admixed with the mixture before froth is separated from the mixture in the intermediate step.

Preferably, the first liquid comprises water and the gas used in forming froth and the flotation steps comprises air.

I have found that, by recycling a portion of the mixture recovered prior to carrying out the last stage, a substantial improvement in the separation efficiency of a given staged flotation separation process can be obtained. The recycle portion of the mixture can be added to the primary stream of the mixture in the system prior to or during the first separation stage or prior to or during any intermediate stage at any point upstream of the point in the operation where the recycle portion of the mixture is separated from the primary purification stream of the mixture. Recycle of a portion of the mixture remaining after an intermediate stage is particularly advantageous for use in flotation separation systems in which froth is formed in each stage by jetting a recycled portion of the mixture into which gas has been induced into a body of the mixture in each stage of purification. The present method provides a significant improvement over prior art flotation systems which employ a purified liquid recovered from the last flotation-separation step for inducing froth formation in every step of the flotation and separation operation.

DESCRIPTION OF THE DRAWING

The attached drawing is a schematic illustration of a preferred embodiment of the present invention. A more detailed description of the drawing is found in the following detailed description of the invention.

DETAILED DESCRIPTION OF THE INVENTION

The improved method of the present invention can be used in conjunction with known systems for staged froth flotation-separation of mixtures of a liquid with any type of particulate solid or liquid material which is at least partly insoluble in the liquid. Representative types of separation systems in which the present method can advantageously be applied includes separation of hydrocarbonaceous liquids such as petroleum fractions from water, separation of valuable minerals from water and from solid mineral waste, and separation of biosolids from water.

Systems must include at least two stages, a first and a last, in order to permit use of the present invention.

To permit optimum use of the invention, a flotation-separation system preferably includes at least three serial stages, through which a primary stream of a mixture is flowed, in turn, during processing. Thus, a suitable system preferably includes at least a first stage, an intermediate stage, and a last stage. Of course, systems including more than one intermediate stage are also suitable for employment of the invention. In each stage, or step, of such an operation, froth containing material to be separated from a mixture must be formed and the froth and material must be separated from the mixture, before the mixture is passed to a subsequent, downstream stage, or is finally removed from the system.

The type of gas used to form froth, or foam, in a system using the present invention is normally dictated by the type of materials being separated. Often, air is suitable for use. In some cases, other gases, e.g., nitrogen or methane are more desirable. The choice of a suitable gas for use in any system employing the invention is within the ability of those skilled in the art.

The present invention can best be described further by reference to the attached drawing. The scope of the invention is not limited to the embodiment shown in the drawing, and a variety of modifications, alternatives, and equivalents within the scope of the invention will be apparent to those skilled in the art from the foregoing and the following further description.

Referring to the drawing, a feed mixture containing a first liquid and a particulate solid or a second liquid is introduced into the system through a conduit 1 and is passed into a first flotation zone 2, wherein a first flotation step is performed. A frothing agent such as a commercially available polyelectrolyte is usually added with the feed in a concentration range of 2 to 40 milligrams per liter. In the first zone 2, a recycle portion of the mixture, into which gas has been induced, provided in a manner described below, is jetted into a body of the feed mixture to mix air with the mixture and form a froth relatively rich in the material to be separated from the mixture. The resulting froth floats on the mixture. The froth is separated from the mixture in a conventionally known manner, such as by skimming, and is removed from the first flotation zone 2 through a conduit 3. Treated mixture is withdrawn from the first zone 2 and is passed through a conduit 4 into an intermediate, second flotation zone 5.

It will be readily understood by those skilled in the art that the flotation zones 2 and 5 can be in communication by any type of opening, passage, etc., which will serve to segregate froth generated in the zone 2 from froth generated in the zone 5 and to insure that a mixture is sufficiently treated in the zone 2, i.e., that its residence time is sufficient, prior to being passed into the zone 5. Thus, the zones 2 and 5 may comprise chambers simply separated by one or more appropriately disposed baffle, with mixture flowing without impediment from the upstream zone 2 to the downstream zone 5 in a path defined by the baffles. The path of the mixture from the zone 2 to the zone 5 is depicted in the drawing, using the conduit 4, is shown for the sake of schematic simplicity.

In the broad scope of the invention, the manner in which froth is formed in the flotation zones 2 and 5, as well as in the other flotation zones discussed below, is not a critical feature. Preferably, however, froth is formed in a given stage by jetting a recycle portion of the mixture recovered from downstream of the stage into a body of the mixture in each stage after gas has been induced into the recycle portion, thus inducing circulation into the body of the mixture of the gas from the freeboard space provided above the body of mixture in each zone. A variety of other suitable means and methods for forming froth in each stage will be apparent to those skilled in the art, e.g., the use of gas jets, mechanical mixers, such as impellers, etc. After froth is formed and separated from the mixture in the intermediate, second flotation zone 5, the froth is withdrawn from the zone 5 and is passed through a conduit 6 into admixture with froth in the conduit 3. Treated mixture remaining after separation of froth is removed from the zone 5 and is passed into a conduit 7.

According to the invention, a recycle portion of the mixture passed into the conduit 7 is removed from the conduit 7 and is contacted with the primary stream of the mixture upstream of the conduit 7, at at least one point upstream of separation of froth from the mixture in the intermediate zone 5. A portion of the effluent mixture from the zone 5 is removed from the conduit 7 through a conduit 8, the amount of the recycle portion removed being regulated in the embodiment shown by a valve 9 operatively connected into the conduit 8. The amount of mixture removed from the main body of the mixture in a conduit 7 and recycled through the conduit 8 is generally between about 40 and about 90 volume percent of the total amount of mixture passed into the conduit 7 from the zone 5. Preferably, the amount of mixture passed into the conduit 8 is maintained between about 50 and about 80 volume percent of the amount of mixture withdrawn from the zone 5 into the conduit 7. By removing the recycle portion of the mixture into the conduit 8, mixture is thereby removed from the main mixture stream of the mixture after froth has been separated from the mixture in the intermediate flotation step carried out in the zone 5 and before gas is mixed with the main stream of the mixture in a last flotation step discussed below. The recycle portion of the mixture recovered from the conduit 7 flows through the conduit 8 into the pump 10 and is ejected from the pump 10 into a conduit 11.

One part of the recycle portion of the mixture ejected from the pump 10 is passed further through the conduit 11 for recycle into the first flotation zone 2, wherein recycled mixture from the conduit 11 is contacted with the main body of feed mixture prior to separating froth from the mixture in the first flotation step. Preferably, the recycled portion of the mixture introduced into the first zone from the conduit 11 is used, after induction of air into the conduit 11, as a jet for mixing air with the liquid in the zone 2 to form froth, as discussed above. The amount of recycled mixture passing into the first zone 2 from the conduit 11 is regulated by a valve 12 operatively connected into the conduit 11.

Another part of the recycle portion of mixture ejected from the pump 10 is passed from the conduit 11 through a conduit 13 into the intermediate, second flotation 5, wherein recycled mixture from the conduit 13 is contacted with the main body of the mixture prior to separating froth from the mixture in the intermediate, second flotation step. Preferably, the recycled portion of the mixture introduced into the intermediate zone 5 from the conduit 13 is used, after induction of air into the conduit 13, as a jet for mixing air with the mixture in the zone 5 to form froth. The amount of recycled mixture passing into the intermediate zone 5 from the conduit 13 is regulated by means of a valve 14 operatively connected into the conduit 11.

After being separated from froth in the intermediate, second zone 5, and being withdrawn from the zone 5 into the conduit 7 and having the recycled portion of the mixture removed therefrom into the conduit 8, the main stream of the mixture in the conduit 7 is passed further into another intermediate flotation zone 15. In the intermediate, third flotation zone 15, the mixture is again mixed with air to form froth. The froth is separated from the mixture, removed from the zone 15 into a conduit 16, and passed into the conduit 3. In the embodiment depicted, a recycle portion of the mixture into which air has been induced, provided in a manner described below, is jetted into a body of the mixture in the zone 15 to mix air with the mixture and form a froth which contains material to be separated from the mixture. After froth is separated and removed, the mixture is withdrawn from the intermediate, third zone 15 and is passed through a conduit 17 into a last, fourth flotation zone 18. In the last zone 18, the mixture is again mixed with gas to form froth which contains material to be separated from the mixture. The froth is then separated from the mixture and is removed from the last flotation zone 18 through a conduit 19 into the conduit 3. Froth in the conduit 3 may then be removed from the flotation system and treated in a conventional manner. After separation from froth, the mixture is withdrawn from the last flotation zone 18 and passed through a conduit 20 into a pump 21. The mixture is ejected from the pump 21 into a conduit 22. A portion of the mixture in the conduit 22 is removed therefrom and passed into a conduit 23 for recycle to the flotation zones 15 and 18. The amount of the mixture passing into the conduit 23 is regulated by means of a valve 24 operatively connected into the conduit 23. A first part of the portion of the mixture in the conduit 23 is passed into the third flotation zone 15. The amount of the mixture recycled to the zone 15 is regulated by a valve 25 on the conduit 23. A second part of the portion of the mixture in the conduit 23 is removed and passed through a conduit 26 into the fourth and last flotation zone 18. The amount of mixture recycled to the zone 18 is controlled by means of a valve 27 operatively connected into the conduit 26. The main stream of the treated mixture is removed from the system through the conduit 22.

The following illustrative embodiment shows a specific preferred embodiment of the invention. The scope of the invention is not limited to the specific details of the embodiment described therein.

ILLUSTRATIVE EMBODIMENT

A system analogous to that depicted in the attached drawing is employed. A mixture comprising water containing 100 milligrams per liter of a substantially insoluble liquid hydrocarbon oil material is introduced into the flotation zone 2 through the conduit 1 at the rate of 1000 gallons per minute along with the addition of 10 milligrams per liter of a commercially available polyelectrolyte. In the flotation zone 2, froth is formed by mixing with the mixture recycled water containing induced air, introduced into the zone 2 at the rate of 500 gallons per minute through the conduit 11. A mixture of water and about 42 milligrams per liter of the oil material is removed from the zone 2 through the conduit 4 and is passed into the intermediate, second flotation zone 5 at the rate of 1485 gallons per minute. Oil-containing froth is removed from the first flotation zone 2 into the conduit 3 at the rate of 15 gallons per minute water and 0.42 pounds per minute oil. In the flotation zone 5, froth is formed by mixing air with the mixture, the air having been previously induced into recycled mixture. The air and recycled mixture are introduced into the zone 5 at the rate of 500 gallons per minute through the conduit 13. A mixture of water and about 25 milligrams per liter of the oil material is removed from the zone 5 through the conduit 7 at the rate of 1970 gallons per minute. Oil-containing froth is removed from the second zone 5 into the conduit 6 and thence into the conduit 3 at the rate of 15 gallons per minute water and 0.21 pounds per minute oil. A recycle portion of the mixture in the conduit 7 is removed into the conduit 8 at the rate of 1000 gallons per minute for recycle through the conduit 8, the pump 10 and the conduits 11 and 14, for use in the zones 2 and 5 as described above. The remainder of the mixture in the conduit 7 is passed into the third flotation zone 15. In the flotation zone 15, froth is formed by mixing air with the mixture after the air is induced into admixture with recycled mixture. The air and recycled mixture are introduced into the zone 15 through the conduit 23 at the rate of 500 gallons per minute. A mixture of water and about 11 milligrams per liter of the oil material is removed from the zone 15 through the conduit 17 and is passed into the last flotation zone 18 at the rate of 1455 gallons per minute. Oil-containing froth is removed from the third flotation zone into the conduit 3 through the conduit 16 at the rate of 15 gallons per minute water and 0.10 pounds per minute of oil. In the flotation zone 18, froth is formed by mixing air with the mixture after air is induced into admixture with recycled mixture. The air and recycled mixture are introduced into the zone 18 at the rate of 500 gallons per minute through the conduit 26. A mixture of water and about 6 milligrams per liter of the oil material is removed from the zone 18 through the conduit 20 at the rate of 1940 gallons per minute. Oil-containing froth is removed from the last flotation zone 18 into the conduit 3 through the conduit 19 at the rate of 15 gallons per minute water and 0.05 pounds per minute oil. The effluent mixture flowing from the conduit 20 goes into the pump 21 and is removed into the conduit 22. A portion of the effluent mixture ejected from the pump 21 in the conduit 22 is recycled through the conduits 23 and 26 for use in the flotation zones 15 and 18 as described above at the rate of 1000 gallons per minute. The remainder of the mixture is recovered from the system through the conduit 22 at the rate of 940 gallons per minute.

A preferred embodiment of the invention having been described, various modifications and equivalents will be apparent. The scope of the invention is intended to be measured by the appended claims and to include such modifications and equivalents.

What is claimed is:

1. In a method for separating a first liquid from a mixture of said first liquid and a particulate solid or a second liquid insoluble in said first liquid, by treating said mixture in a series of flotation steps including at least a first step and a last step, each said step including (1) forming froth including said solid or said second liquid by mixing gas with said mixture and (2) separating froth from said mixture, and said last step further including contacting a first recycle portion of said mixture remaining after froth is separated therefrom in said last step with said mixture prior to separating froth therefrom in said last step, the improvement comprising: admixing said mixture, before separating froth from said mixture in said first step, with a second recycle portion of said mixture remaining after froth is separated from said mixture in said first step and before gas is mixed with said mixture in said last step, said second recycle portion being segregated from said first recycle portion.

2. An improved method according to claim 1 wherein said series of flotation steps includes at least one intermediate step, said recycle second portion is separated from said mixture after froth is separated from said mixture in said intermediate step, and said recycle second portion is admixed with said mixture before froth is separated from said mixture in said intermediate step.

3. An improved method according to claim 1 wherein said first liquid comprises water.

4. An improved method according to claim 1 wherein froth is formed in said flotation steps by mixing air with said mixture.

5. An improved method according to claim 1 wherein said mixture includes a particulate solid.

6. An improved method according to claim 1 wherein said mixture includes a second liquid, and said second liquid is a hydrocarbonaceous liquid substantially insoluble in said first liquid.

* * * * *